United States Patent
Kennedy

(10) Patent No.: US 9,982,449 B1
(45) Date of Patent: May 29, 2018

(54) POOL CIRCULATION SYSTEM

(71) Applicant: Todd Kennedy, Kernsville, NC (US)

(72) Inventor: Todd Kennedy, Kernsville, NC (US)

(*) Notice: Subject to any disclaimer, the term of this patent is extended or adjusted under 35 U.S.C. 154(b) by 0 days. days.

(21) Appl. No.: 15/235,314

(22) Filed: Aug. 12, 2016

(51) Int. Cl.
| E04H 4/12 | (2006.01) |
| C02F 1/00 | (2006.01) |
| C02F 103/42 | (2006.01) |

(52) U.S. Cl.
CPC ........... E04H 4/1245 (2013.01); C02F 1/001 (2013.01); *C02F 2103/42* (2013.01)

(58) Field of Classification Search
CPC ..... E04H 4/1245; C02F 1/001; C02F 2103/42
USPC .......................... 210/167.16, 167.1, 232, 460
See application file for complete search history.

(56) References Cited

U.S. PATENT DOCUMENTS

| 3,132,364 A * | 5/1964 | Oxley ................... E04H 4/1609 15/1.7 |
| 3,688,908 A | 9/1972 | Myers et al. |
| 3,722,686 A * | 3/1973 | Arnett ................... B01D 29/01 210/170.09 |
| 5,338,446 A | 8/1994 | Schuman |
| 5,863,425 A * | 1/1999 | Herlehy ................ A47L 9/1427 15/1.7 |
| 6,066,253 A | 5/2000 | Idland |
| 6,299,700 B1 * | 10/2001 | Grobler ................ E04H 4/1645 134/111 |
| 6,592,341 B1 | 7/2003 | Olney |
| 6,875,346 B2 | 4/2005 | Fox et al. |
| 6,939,463 B2 | 9/2005 | Leaverton |
| 8,192,622 B2 * | 6/2012 | Kozey ................... B01D 29/33 210/232 |
| 2004/0124127 A1 * | 7/2004 | Fox ........................ B01D 29/15 210/167.12 |
| 2011/0247970 A1 | 10/2011 | Evingham |

FOREIGN PATENT DOCUMENTS

WO   WO2016069997   10/2015

* cited by examiner

*Primary Examiner* — Fred Prince
(74) *Attorney, Agent, or Firm* — Eric Karich; Karich & Associates

(57) ABSTRACT

A pool circulation system has a water intake device that is attached to an intake port with an intake hose. The water intake device includes an intake housing that defines an inner chamber; a plurality of apertures; an outer screen that fits over the intake housing to cover the plurality of apertures; and a hose attachment fitting for attaching the intake hose. A deadweight anchor is attached to the water intake device for holding the water intake device on the bottom of the swimming pool.

8 Claims, 2 Drawing Sheets

POOL CIRCULATION SYSTEM

BACKGROUND OF THE INVENTION

Field of the Invention

This invention relates generally to pool filtration systems, and more particularly to a pool circulation system for circulating water from the bottom of a swimming pool through a filter.

Description of Related Art

Idland, U.S. Pat. No. 6,066,253, teaches a cover unit that is mounted on the intake of a pool filter to prevent part of a bather from being inadvertently captured by the suction generated by the intake. The cover includes an outer filter material, and an inner housing with apertures. However, this device is directly and fixedly mounted directly to the intake adjacent the surface on the side of the pool.

Leaverton, U.S. Pat. No. 6,939,463, teaches another similar filter device for a spa or pool, having a filter body which receives a filter bag having a sheath encompassing the exterior of the filter body. This device is adapted to be placed within a skimmer, and operation of the spa water circulation system draws spa water into the filter bag pocket while concurrently spa water is drawn transversely through the filter bag sheath and auxiliary spa water openings into the filter body.

Schuman, U.S. Pat. No. 5,338,446, teaches a filter unit that is adapted to be attached to a skipper and is capable of receiving a cartridge-type filter element is provided for use in-line with a suction-type pool cleaning device. The unit has an elongated housing with intake and outlet ports at opposite ends. The intake port may be connected via a hose to a pool cleaning device that may be located at the bottom of the pool. The unit can use a filter cartridge with an element that offers a filtration coarseness somewhere between that of the system filter and a strainer element. The housing may be adapted to receive a strainer basket in place of the filter cartridge and thus serve as a conventional leaf-trap.

Evingham, U.S. 20110247970, teaches a portable submersible pump and filter assembly for direct filtration of a body of water without the need for intake or discharge hoses or assemblies. The device does not attach to an intake or a skimmer of a pool.

The prior art teaches many filters and filter-like devices that have structures and features that are generally similar to the present invention; however, they all contain important structural differences from the present invention, and are installed in a configuration that is notably different than the present invention. The present invention fulfills these needs and provides further advantages as described in the following summary.

SUMMARY OF THE INVENTION

The present invention teaches certain benefits in construction and use which give rise to the objectives described below.

The present invention provides a pool circulation system for circulating water from a bottom of a swimming pool. The pool circulation system includes a water intake device comprising an intake housing that defines an inner chamber; a plurality of apertures through the intake housing that allow the water to flow into the inner chamber of the intake housing; an outer screen that fits over the intake housing to cover the plurality of apertures; and a hose attachment fitting attached to the intake housing for drawing the water from the inner chamber of the intake housing. A deadweight anchor is attached to the water intake device for holding the water intake device on the bottom of the swimming pool. An intake hose attaches the hose attachment fitting to an intake port of the swimming pool. A pump and a filter is operably installed to draw the water from the intake port, pass it through the filter, and return the water to a return port of the swimming pool.

A primary objective of the present invention is to provide a pool circulation system having advantages not taught by the prior art.

Another objective is to provide a pool circulation system that draws water from the bottom of a swimming pool for filtration and circulation of the water.

A further objective is to provide a pool circulation system that provides superior performance over existing pool filtration and circulation systems.

A further objective is to provide a pool circulation system that is inexpensive to manufacture and easy to install and use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a pool circulation system 10 for circulating water from the bottom 14 of a swimming pool 12, through a filter 56, and back into the swimming pool 12.

Figure 1:
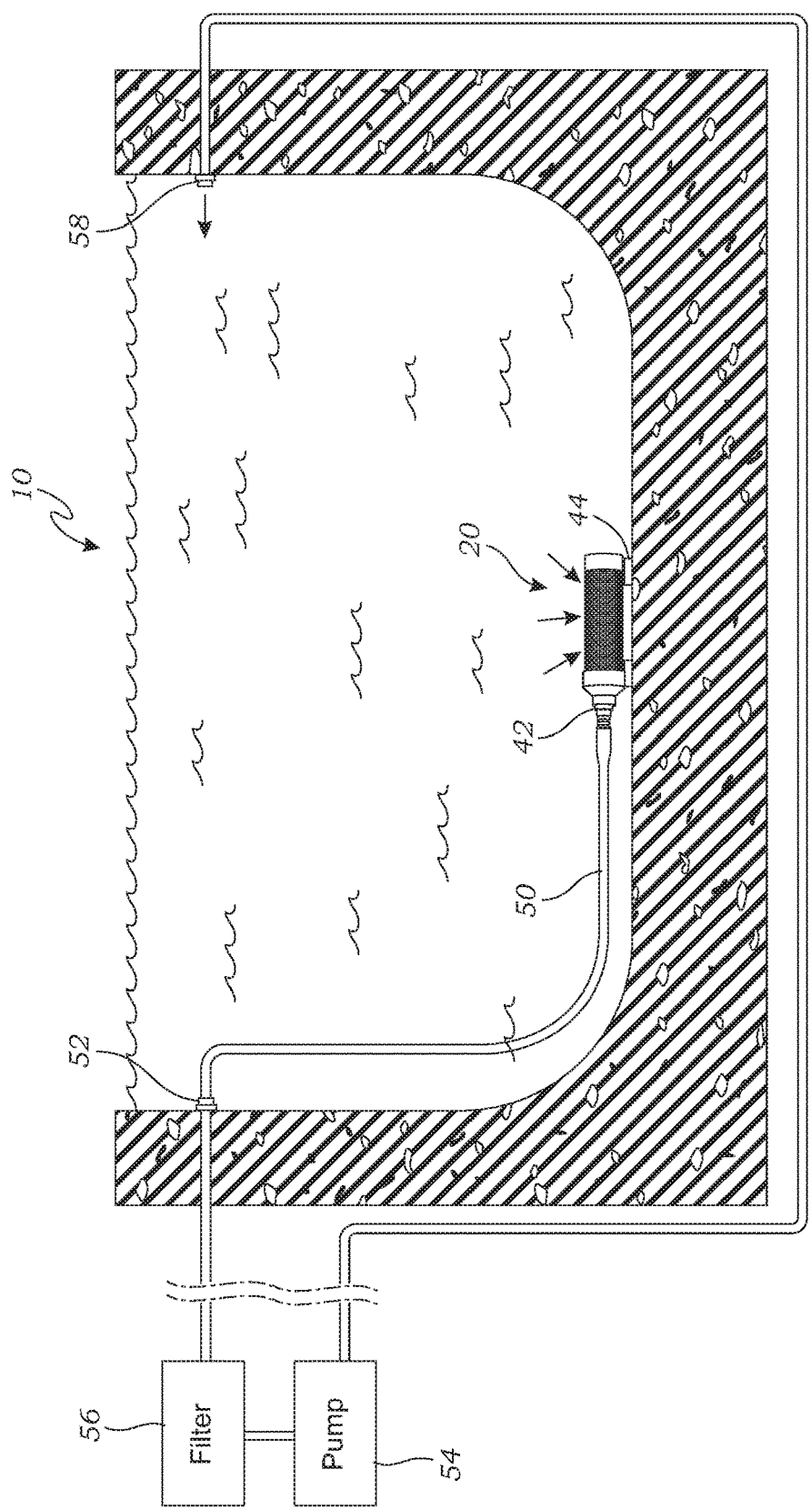
FIG. 1 is a side sectional view of a swimming pool that includes a pool circulation system according to one embodiment of the present invention, the pool circulation system including a water intake device that is operably positioned in a bottom of the swimming pool and attached to an intake port of the swimming pool.

FIG. 1 is a side sectional view of a swimming pool 12 that includes the pool circulation system 10 according to one embodiment of the present invention. As shown in FIG. 1, the pool circulation system 10 including a water intake device 20 that is held on the bottom 14 of the swimming pool 12 with a deadweight anchor 44, and is attached to an intake port 52 of the swimming pool 12 with an intake hose 50. The intake port 52 may be in the form of a standard port, a skimmer, or any other suitable intake known in the art.

Figure 2:
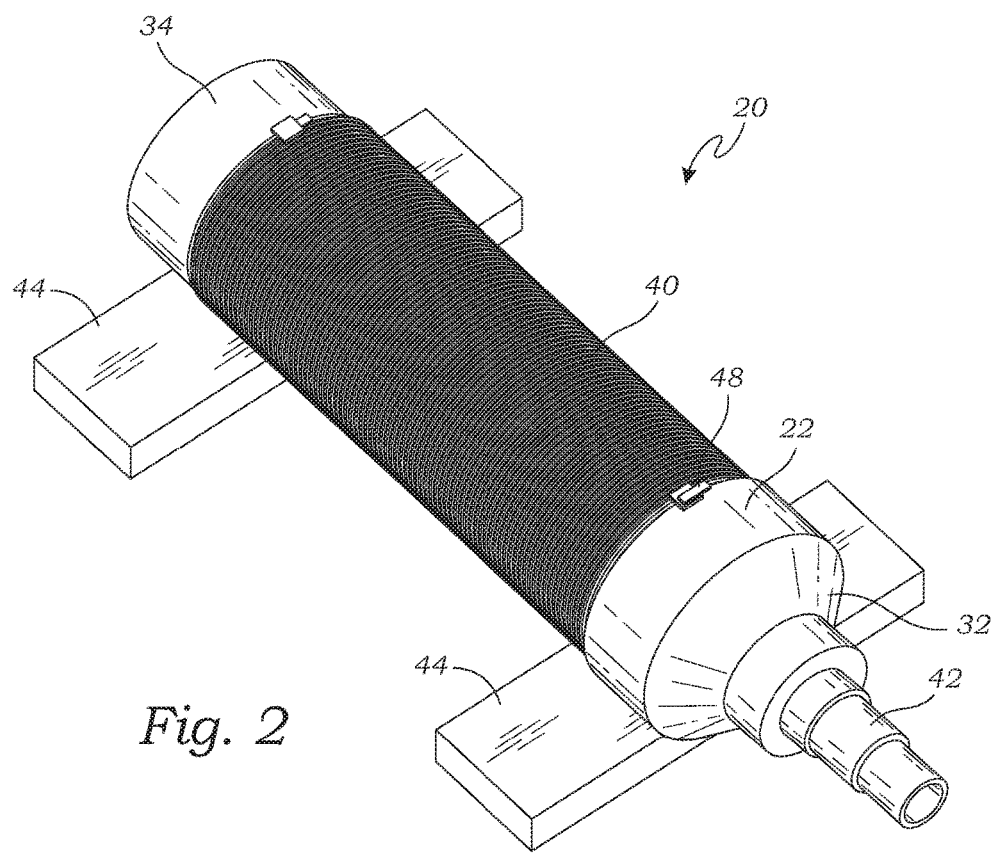
FIG. 2 is a perspective view of the water intake device of the pool circulation system.
Figure 3:
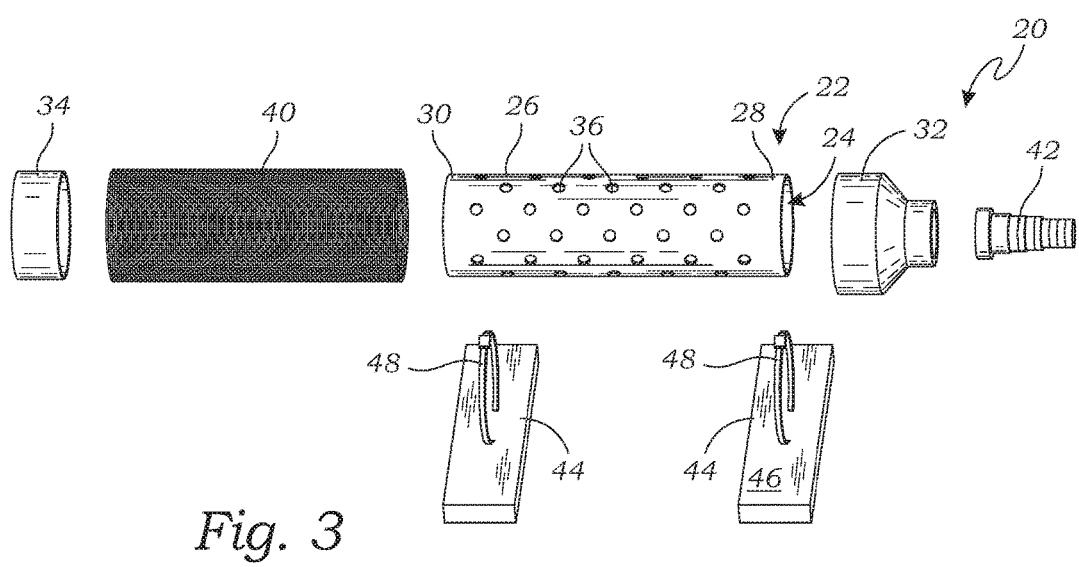
FIG. 3 is an exploded perspective view thereof.

FIG. 2 is a perspective view of the water intake device 20 of the pool circulation system 10 of FIG. 1. FIG. 3 is an exploded perspective view thereof. As shown in FIGS. 2-3, the water intake device 20 comprises an intake housing 22 that defines an inner chamber 24, and a plurality of apertures 36 through the intake housing 22 that allow the water to flow into the inner chamber 24 of the intake housing 22.

In the embodiment of FIGS. 2-3, the intake housing 22 includes a tubular portion 26 that includes a proximal end 28 and a distal end 30. The tubular portion 26 may include the plurality of apertures 36. In this embodiment, the tubular portion 26 is cylindrical; however, in alternative embodiments, the tubular portion 26 may have other cross sectional shapes. In this embodiment, the intake housing 22 further includes a top cap 32 and an end cap 34; the top cap 32 is mounted on the proximal end 28 of the tubular portion 26 of the intake housing 22; and the end cap 34 is mounted on the distal end 30 of the tubular portion 26. When assembled, the top cap 32, the end cap 34, and the tubular portion 26 together define the inner chamber 24.

While one embodiment of the intake housing 22 is illustrated, the intake housing 22 may also be constructed entirely differently. For example, the housing could be a single molded unit, or other arrangements of subcomponents, using designs known to those skilled in the art. Such alternative constructions are considered within the scope of the present invention.

In the embodiment of FIGS. 2-3, the water intake device 20 further includes an outer screen 40 that fits over the intake housing 22 to cover the plurality of apertures 36. In this embodiment, the outer screen 40 is positioned over the tubular portion 26 of the intake housing 22 and between the top cap 32 and end cap 34. The outer screen 40 is a safety screen to prevent unwanted debris or other articles from being drawn into the water intake device 20. This screen 40 is not fine enough to filter out particulates or otherwise serve as a water filter, and the water intake device 20 does not include a filter, only to prevent larger items from being drawn into the system. For purposes of this application, the term "screen" is defined to mean a coarse lattice or mesh that includes holes that are too large to filter out particulates, and the term "filter" is defined to include any form of fabric, mesh, or similar material known in the art for removing particulate contamination from water such as is known to one skilled in the art.

In the embodiment of FIGS. 1-3, the water intake device 20 further includes a hose attachment fitting 42 for attaching a hose 50 (shown in FIG. 1) for sucking out the water from the inner chamber 24 of the intake housing 22. The hose attachment fitting 42 is operably mounted on the intake housing 22 and in fluid contact therewith. In this embodiment, the hose attachment fitting 42 is operably mounted on the top cap 32; however, in alternative embodiments, the hose attachment fitting 42 may be otherwise mounted on the intake housing 22.

In the embodiment of FIGS. 1-3, the water intake device 20 further includes weighted device 44 or similar structure for holding the water intake device 20 on or adjacent the bottom 14 of the swimming pool 12. In the present embodiment, the weighted device 44 is in the form of a deadweight anchor 44 attached to the water intake device 20. In one embodiment, the deadweight anchor 44 includes a scuff-resistant outer covering 46 (e.g., fabric covering, rubberized coating, etc.) that protects the bottom of the pool from damage. The deadweight anchor 44 may be attached to the water intake device 20 with an attachment device 48, in this case an attachment band (e.g., strap, cord, etc.). Alternatively, the attachment device 48 may be other attachment device or method, such as integrally attaching the weigh to the device 20, attaching it with an arm, adhesive, or any other mechanism known in the art.

As shown in FIG. 1, upon installation, the intake hose 50 is attached to the hose attachment fitting 42 and to an intake port 52 of the swimming pool 12. The pool includes a pump 54 and a filter 56 operably installed to draw the water from the intake port 52, pass it through the filter 56, and return the water to a return port 58 of the swimming pool 12. As long as the weighted device 44 holds the water intake device 20 on the bottom of the pool 12, water drawn by the pump 54 is drawn from the bottom of the pool 12. This contrasts with prior art devices, which draw water from the top of the pool 12. By drawing the water from the bottom of the pool 12, the pool is more effectively cleaned and circulated.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A pool circulation system for circulating water from a bottom of a swimming pool, the pool circulation system comprising:
   a water intake device comprising:
      an intake housing that defines an inner chamber;
      a plurality of apertures through the intake housing that allow the water to flow into the inner chamber of the intake housing;
      an outer screen that fits over the intake housing to cover the plurality of apertures; and
      a hose attachment fitting attached to the intake housing for drawing the water from the inner chamber of the intake housing;
   a deadweight anchor attached to the water intake device for holding the water intake device on the bottom of the swimming pool, the deadweight anchor having a scuff-resistant fabric or rubberized outer covering;
   an intake hose that attaches the hose attachment fitting to an intake port of the swimming pool; and
   a pump and a filter operably installed to draw the water from the intake port, pass it through the filter, and return the water to a return port of the swimming pool.

2. The pool circulation system of claim 1, wherein the deadweight anchor includes a pair of anchors that each include the scuff-resistant fabric or rubberized outer covering, and each of the pair of anchors further comprising an attachment band shaped to encircle the water intake device for attaching each of the pair of anchors to the water intake device.

3. The pool circulation system of claim 2, wherein one of the pair of deadweight anchors is attached to a proximal end of the intake housing, and the other of the pair of deadweight anchors is attached to a distal end of the intake housing.

4. The pool circulation system of claim 1, wherein the intake housing includes a tubular portion that includes a proximal end and a distal end and the plurality of apertures, and wherein the intake housing further includes a top cap and an end cap.

5. The pool circulation system of claim 4, wherein the top cap is mounted on the proximal end of the tubular portion of the intake housing and the end cap is mounted on the distal end of the tubular portion so that the top cap, the end cap, and the tubular portion together define the inner chamber.

6. The pool circulation system of claim 5, wherein the outer screen is positioned over the tubular portion of the intake housing and between the top cap and end cap.

7. The pool circulation system of claim 6, wherein the hose attachment fitting is operably mounted on the top cap.

8. A method for circulating water from the bottom of a swimming pool having an intake port and a pump and a filter for pumping the water from the intake port through a filter and to a return port, the method comprising the steps of:
  providing a water intake device comprising:
    an intake housing that defines an inner chamber;
    a plurality of apertures through the intake housing that allow the water to flow into the inner chamber of the intake housing;
    an outer screen that fits over the intake housing to cover the plurality of apertures;
    a hose attachment fitting attached to the intake housing for drawing the water from the inner chamber of the intake housing; and
    a deadweight anchor having a scuff-resistant fabric or rubberized outer covering;
  attaching the deadweight anchor to the water intake device;
  connecting the hose attachment fitting to the intake port of the swimming pool with a hose;
  dropping the water intake device into the swimming pool so that the deadweight anchor sinks to the bottom of the swimming pool and the water intake device is held proximate the bottom of the swimming pool by the deadweight anchor, while the fabric or rubberized covering of the deadweight anchor prevents scratching of the bottom of the swimming pool;
  pumping so that the water from the bottom of the swimming pool is drawn into the water intake device, into the intake port, where it passes through the filter and out through the return port and back into the swimming pool.

\* \* \* \* \*